United States Patent
Fitzgerald et al.

(10) Patent No.: US 11,209,633 B2
(45) Date of Patent: Dec. 28, 2021

(54) IRIS IMAGE ACQUISITION SYSTEM

(71) Applicant: FotoNation Limited, Galway (IE)

(72) Inventors: Niamh Fitzgerald, Galway (IE);
Christopher Dainty, Galway (IE);
Alexander Goncharov, Galway (IE)

(73) Assignee: FotoNation Limited, Galway (IE)

( * ) Notice: Subject to any disclaimer, the term of this patent is extended or adjusted under 35 U.S.C. 154(b) by 320 days.

(21) Appl. No.: 15/973,359

(22) Filed: May 7, 2018

(65) Prior Publication Data

US 2019/0265445 A1    Aug. 29, 2019

Related U.S. Application Data

(60) Provisional application No. 62/635,408, filed on Feb. 26, 2018.

(51) Int. Cl.
*G02B 13/18*    (2006.01)
*H04N 5/225*    (2006.01)
(Continued)

(52) U.S. Cl.
CPC .............. *G02B 13/18* (2013.01); *G02B 5/001* (2013.01); *G02B 27/0025* (2013.01);
(Continued)

(58) Field of Classification Search
CPC .............. G02B 13/0025; G02B 13/003; G02B 13/0075; G02B 13/18; G02B 15/04;
(Continued)

(56) References Cited

U.S. PATENT DOCUMENTS

| | | | | |
|---|---|---|---|---|
| 5,748,371 A | * | 5/1998 | Cathey, Jr. ......... | G02B 27/0075 |
| | | | | 359/558 |
| 6,603,608 B2 | * | 8/2003 | Togino ................... | G02B 15/04 |
| | | | | 359/422 |

(Continued)

FOREIGN PATENT DOCUMENTS

WO    2017/215952 A1    12/2017

OTHER PUBLICATIONS

Fuerschbach et al., "A new family of optical systems employing phi-polynomial surfaces," Optics express 19(22), p. 21919-21928 (2011). (Year: 2011).*

(Continued)

*Primary Examiner* — Nicholas R. Pasko
(74) *Attorney, Agent, or Firm* — Lee & Hayes, P.C.

(57) ABSTRACT

An iris image acquisition system for a mobile device, comprises a lens assembly arranged along an optical axis and configured for forming an image comprising at least one iris of a subject disposed frontally to the lens assembly; and an image sensor configured to acquire the formed image. The lens assembly comprises a first lens refractive element and at least one second lens element for converging incident radiation to the first refractive element. The first refractive element has a variable thickness configured to counteract a shift of the formed image along the optical axis induced by change in iris-lens assembly distance, such that different areas of the image sensor on which irises at different respective iris-lens assembly distances are formed are in focus within a range of respective iris-lens assembly distances at which iris detail is provided at sufficient contrast to be recognised.

22 Claims, 9 Drawing Sheets

(51) Int. Cl.
  *G02B 27/00* (2006.01)
  *G06K 9/20* (2006.01)
  *G06K 9/00* (2006.01)
  *G02B 5/00* (2006.01)
(52) U.S. Cl.
  CPC ..... *G02B 27/0075* (2013.01); *G06K 9/00604* (2013.01); *G06K 9/209* (2013.01); *H04N 5/2254* (2013.01)
(58) Field of Classification Search
  CPC ........ G02B 15/06; G02B 15/08; G02B 5/001; G02B 27/0025; G02B 27/0075
  USPC ......................................... 359/716, 717, 718
  See application file for complete search history.

(56) References Cited

U.S. PATENT DOCUMENTS

| | | | |
|---|---|---|---|
| 7,106,510 B2* | 9/2006 | Dowski, Jr. ............... | G02B 5/00 359/11 |
| 7,209,293 B2* | 4/2007 | Gaida .................... | G02B 21/02 359/656 |
| 7,551,370 B2* | 6/2009 | Vinogradov ....... | G02B 27/0025 359/709 |
| 7,652,685 B2* | 1/2010 | Wach .................. | G02B 27/0025 348/78 |
| 7,773,316 B2* | 8/2010 | Alon ...................... | H04N 5/217 359/754 |
| 8,194,170 B2* | 6/2012 | Golub .................... | G02B 5/001 348/335 |
| 8,594,388 B2* | 11/2013 | Mathieu ................. | G02B 13/20 382/117 |
| 8,687,040 B2* | 4/2014 | Silveira ..................... | G02F 1/29 348/36 |
| 8,743,266 B2* | 6/2014 | Kishine .................. | G06K 9/228 348/340 |
| 9,083,885 B1 | 7/2015 | Chen et al. | |
| 9,366,843 B2* | 6/2016 | Prabhakar ............ | A61B 5/1171 |
| 2006/0171041 A1 | 8/2006 | Olmstead et al. | |
| 2008/0023549 A1* | 1/2008 | Gurevich ........... | G06K 7/10702 235/462.22 |
| 2008/0239509 A1* | 10/2008 | Vinogradov ....... | G06K 7/10722 359/709 |
| 2010/0110275 A1 | 5/2010 | Mathieu | |
| 2011/0085050 A1* | 4/2011 | Dowski, Jr. ............. | G06T 7/292 348/222.1 |
| 2015/0156478 A1* | 6/2015 | Ono ..................... | G02B 3/0043 348/49 |
| 2015/0301318 A1 | 10/2015 | Ivanisov et al. | |

OTHER PUBLICATIONS

Narayanswamy et al., "Extending the imaging volume for biometric iris recognition," Applied Optics 44(5), pp. 701-712, Feb. 10, 2005. (Year: 2005).*
Parigger et al., "Shperical aberration effects in lens-axicon doublets: theoretical study," Applied Optics 36(31), pp. 8214-2881, Nov. 1, 1997. (Year: 1997).*
Van der Gracht et al., "Aspheric optical elements for extended depth-of-field imaging," Proc. SPIE 2537, Novel Optical Systems Design and Optimization, (Aug. 11, 1995); doi: 10.1117/12.216392. (Year: 1995).*
Van der Gracht et al., "Extended depth-of-field iris recognition system for a workstation environment," Proc. SPIE 5779, Biometric Technology for Human Identification II, (Mar. 28, 2005); doi: 10.1117/12.603612 (Year: 2005).*
Van der Gracht et al., "Iris recognition with enhanced depth-of-field image acquistion," Proc. SPIE 5438, Visual Information Processing XIII, (Jul. 15, 2004); doi: 10.1117/12.542151 (Year: 2004).*
Fuerschbach, "Freeform, phi-Polynomial Optical Surfaces: Optical Design, Fabrication, and Assembly," PhD thesis, University of Rochester, Rochester, NY. (Year: 2014).*
Zhai et al, "Extended depth of field through an axicon", Journal of Modern Optics vol. 56, No. 11, Jun. 20, 2009, 1304-1308.
Chu, K., George, N., and Chi, W., "Extending the depth of field through unbalanced optical path difference", Applied optics 47(36), pp. 6895-6903 (2008).
Favaro, P., "A split-sensor light field camera for extended depth of field and superresolution," in Proc. SPIE, 8436, 843602 (2012).
Mizoguchi, N., Oku, H., and Ishikawa, M., "High-speed variable-focus optical system for extended depth of field," IEEE International Symposium on Industrial Electronics, 2009. ISIE 2009., pp. 1668-1673, IEEE (2009).
Nakamura, T., Horisaki, R., and Tanida, J., "Computational superposition compound eye imaging for extended depth-of-field and field-of-view," Optics express 20(25), p. 27482-27495 (2012).
A. K. Jain, A. Ross, and S. Prabhakar, "An introduction to biometric recognition," IEEE Trans. Circuits Syst. Video Technol., vol. 14, 2004, pp. 4-20.
Sheng Liu and Hong Hua, "Extended depth-of-field microscopic imaging with a variable focus microscope objective", Opt. Express, 19(1)1353-362, Jan. 2011.
Wang, L., Hayakawa, T., and Ishikawa, M., "Depth of field extended imaging method based on intensification of time and spatial expansion," in Nanosensors, Biosensors, Info-Tech Sensors and 3D Systems 2017, 10167, 101670C, International Society for Optics and Photonics (2017).
Edward R Dowski and W Thomas Cathey, "Extended depth of field through wave-front coding", Applied Optics, 34(11):1859-1866, 1995.
Fuerschbach, K., Rolland, J. P., and Thompson, K. P., "A new family of optical systems employing—polynomial surfaces," Optics express 19(22), p. 21919-21928 (2011).
Broemel, A., Lippmann, U., and Gross, H., "Freeform surface descriptions, part i: Mathematical representations," Advanced Optical Technologies 6(5), 327{336 (2017).
Ye, J., Chen, L., Li, X., Yuan, Q., and Gao, Z., "Review of optical freeform surface representation technique and its application," Optical Engineering 56(11), p. 110901-1 through 110901-15, (2017).
Niamh M. Fitzgerald, Chistopher Dainty, and Alexander V. Goncharov, "Extending the depth of field with chromatic aberration for dual-wavelength iris imaging", Opt. Express, 25(25):31696-31707, Dec. 2017.
European Patent Office, International Search Authority, "International Search Report and Written Opinion" of International Application No. PCT/EP2017/063435 filed Jun. 2, 2017, titled "An Iris Image Acquisition System", Search completed Aug. 18, 2017 and dated Aug. 28, 2017, 12 pages.
Gross H., Zugge, H., Peschka, M., and Blechinger, F., "Handbook of optical systems, vol. 3: Aberration theory and correction of optical systems," (2007), 772 pages.

* cited by examiner

Odd aspheric coefficients

| Surface # | y | Y^2 | Y^3 | Y^4 | Y^5 | Y^6 |
|---|---|---|---|---|---|---|
| 5a | 2.8458e-005 | 0.1357 | -0.0494 | 0 | 0 | 0 |
| 6a | 0.7397 | -3.3745 | 8.1871 | -9.4270 | 4.3304 | -0.1383 |

Even aspheric coefficients

| Surface # | Y^4 | Y^6 | Y^8 | Y^10 |
|---|---|---|---|---|
| 1a | 0.0109 | 2.1007e-003 | -1.512e-004 | 9.1131e-5 |
| 2a | 5.3896e-003 | 1.5702e-003 | 1.0482e-003 | -7.536e-004 |
| 3a | -0.0108 | -2.539e-003 | -1.573e-003 | -5.363e-004 |
| 4a | 4.6092e-003 | 2.3727e-003 | -1.803e-003 | 6.6873e-004 |

Figure 3

| Surface | Surface Type | Radius (mm) | Thickness (mm) | Ref Index | Semi-Diameter | Comment | Conic k |
|---|---|---|---|---|---|---|---|
| | Object | Infinity | 220 – 400 mm | Air | 30-40 | Object position | 0 |
| 1a | Even Asphere | 2.2119 | 0.9 | N-SF5 | 1.1567 | Front lens 1 | -1 |
| 2a | Even Asphere | 5.5529 | 1.3 | Air | 0.9529 | Back lens 1 | -1 |
| 3a | Even Asphere | 7.5963 | 0.9 | N-SF5 | 0.9072 | Front lens 2 | -1 |
| 4a | Even Asphere | -16.6200 | 1.5 | Air | 0.8660 | Back lens 2 | -1 |
| 5a | Odd Asphere | Infinity | 0.15 | N-SF5 | 0.6995 | Front axicon | 0 |
| 6a | Odd Asphere | Infinity | 0.15 | Air | 0.6752 | Back axicon | 0 |
| 7a | Image | Infinity | - | Air | 0.6911 | Sensor | 0 |

Figure 4

| | |
|---|---|
| Wavelength range | 0.94 +- 0.2 μm |
| Field of view | 30 to 40 mm in x |
| Object range | 220 mm to 400 mm |
| Entrance pupil diameter | 2.2 mm |
| Focal length | 2.56016 mm |
| Total track length | 4.9 mm |

Odd order aspheric coefficients

| Surface # | y^3 | y^5 | y^7 |
|---|---|---|---|
| 1b | 0.0114 | 6.9117e-003 | 7.1554e-4 |
| 3b | 0.0288 | -0.0151 | 9.6007e-4 |
| 4b | 0.0449 | 0.0202 | -0.0161 |
| 5b | 0.0660 | 0.1482 | 0.0592 |

Zernike Fringe Polynomial Terms

| Zernike Term | $Z(\rho,\phi)$ | |
|---|---|---|
| 5 | $\rho^2 cos2\phi$ | 0.0562 |
| 9 | $6\rho^4 - 6\rho^2 + 1$ | 0.0424 |
| 12 | $(4\rho^2 - 3)\rho^2 cos2\phi$ | -0.0523 |
| 16 | $20\rho^6 - 30\rho^4 + 12\rho^2 - 1$ | 6.1284e-3 |
| 17 | $\rho^4 cos4\phi$ | -0.0651 |
| 26 | $70\rho^8 - 140\rho^6 + 90\rho^4 - 20\rho^2 + 1$ | -1.239e-3 |
| 27 | $\rho^5 cos5\phi$ | 4.1113e-6 |

Lens data

| Surface # | Surface Type | Radius (mm) | Thickness (mm) | Ref Index | Semi-Diameter (mm) | Comment | Conic k |
|---|---|---|---|---|---|---|---|
|  | Object | Infinity | 200 – 400 mm | Air | 30-40 | Object varying in position | 0 |
| 1 | Odd Asphere | 1.9355 | 0.8313 | N-BK7 | 1.1817 | Front lens 1 | -1 |
| 2b | Standard (spherical) | -2.6024 | 0.7803 | N-SF5 | 1.1606 | Back lens 1/Front lens 2 | -1 |
| 3b | Odd Asphere | -72.820 | 0.2263 | Air | 1.0885 | Back lens 2 | -1 |
| 4b | Odd Asphere | 2.4329 | 1.1528 | N-BK7 | 1.0303 | Front lens 3 | -1 |
| 5b | Odd Asphere | 2.9109 | 1.2130 | Air | 0.7602 | Back lens 3 | -1 |
| 6b | Standard | Infinity | 0.2116 | N-Bk7 | 0.7095 | Front plate | 0 |
| 7b | Zernike Fringe Sag | Infinity | 0.100 | Air | 0.7031 | Back plate | 0 |
| 8 | Image | Infinity | - | Air | 0.7033 | Sensor | 0 |

Figure 8

| | |
|---|---|
| Wavelength range | 0.94 +- 0.2 μm |
| Field of view | 30 to 40 mm in x |
| Object range | 200 mm to 400 mm |
| Entrance pupil diameter | 2.2 mm |
| Focal length | 3.38862 mm |
| Total track length | 4.51528 mm |

Figure 9

IRIS IMAGE ACQUISITION SYSTEM

FIELD

The present invention relates to an iris image acquisition system for a mobile device.

BACKGROUND

In imaging systems, Depth of Field (DOF) is a parameter in which an object can shift along the optical axis and remain in focus on a fixed position image sensor. An average calculation for the depth of field is described by $\Delta Z = \pm 2\lambda (l^2)/(D^2)$, where $\lambda$ is the wavelength, l is the object distance and D is the diameter of the acquisition lens.

Note that as disclosed in PCT Application WO2017/215952 (Ref: FN-477-PCT) and Niamh M. Fitzgerald, Christopher Dainty, and Alexander V. Goncharov, "Extending the depth of field with chromatic aberration for dual-wavelength iris imaging", *Opt. Express,* 25(25):31696-31707, December 2017, the depth of field is asymmetric about an object point.

Various techniques have been proposed to extend the DOF. In particular, Zhongsheng Zhai et al, "Extended depth of field through an axicon", Journal of Modern Optics Vol. 56, No. 11, 20 Jun. 2009, 1304-1308, discloses an optical system including a refractive axicon for imaging with an extended depth of field. A CCD camera captures intermediate images and uses a digital process to obtain the final images. The DOF is analysed based on the condition of the focal segment.

Chu, K., George, N., and Chi, W., "Extending the depth of field through unbalanced optical path difference", Applied optics 47(36), 6895{6903 (2008), discloses a variable thickness element with a stepped profile which is placed in the pupil of a lens to extend the DOF.

Wang, L., Hayakawa, T., and Ishikawa, M., "Depth of field extended imaging method based on intensification of time and spatial expansion," in Nanosensors, Biosensors, Info-Tech Sensors and 3D Systems 2017, 10167, 101670C, International Society for Optics and Photonics (2017), discloses a variable focus system consisting of a rotating slide of glass plates, each with different thicknesses. The system can provide an extended DOF to a microscopic apparatus. This effect is achieved using the simple relation of the image shift with plate thickness.

Favaro, P., "A split-sensor light field camera for extended depth of field and super resolution," in Proc. SPIE, 8436, 843602 (2012) discloses a plenoptic camera with two beam splitters between the main optics and the microlens array situated in front of the detector where the light is split between near and far conjugates. The first beam splitter is partially reflective and partially transmissive—half directly towards the top half of the detector while the reflected percentage is reflected at 45 degrees at another while the second beam splitter is only reflective and redirects the beam to the lower half of the sensor. The images are then used for super resolution demonstrating digital refocusing.

Mizoguchi, N., Oku, H., and Ishikawa, M., "High-speed variable-focus optical system for extended depth of field," IEEE International Symposium on Industrial Electronics, 2009. ISIE 2009., 1668{1673, IEEE (2009), discloses a high speed variable focus lens that can allow for an extended DOF.

Nakamura, T., Horisaki, R., and Tanida, J., "Computational superposition compound eye imaging for extended depth-of-field and field-of-view," Optics express 20(25), 27482{27495 (2012) discloses an increase in DOF and FOV using a spherical array of lenses of different focuses which yields a spherical superposition compound. The spherical array or optics creates a 3D space-invariant point spread function that is later used in deconvolve a single image with an increased DOF and FOV.

Imaging systems can be used in mobile devices, such as a smartphone or tablet, for acquiring iris images for user's biometric recognition. In particular, A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric. Typically, an image of an iris is best acquired in a dedicated imaging system that uses infra-red (IR) illumination, typically near infra-red (NIR) in the range of 700-900 nm.

Positioning of an object such as the iris within a shallow DOF can be challenging, and imaging the iris outside the designated DOF requires refocusing.

Typically refocusing of an object outside the DOF is achieved in imaging systems by moving mechanical parts, such as disclosed in Sheng Liu and Hong Hua, "Extended depth-of-field microscopic imaging with a variable focus microscope objective", *Opt. Express,* 19(1):353-362, January 2011 or using computationally intensive algorithms, such as disclosed by Edward R Dowski and W Thomas Cathey, "Extended depth of field through wave-front coding", *Applied Optics,* 34(11):1859-1866, 1995.

WO2017/215952 (Ref: FN-477-PCT), referred to above, discloses an iris acquisition system comprising a NIR light source capable of selectively emitting light with different discrete NIR wavelengths. The wavelengths are matched with the refractive index of the material used for a lens assembly of the system to balance an axial image shift induced by change in iris-lens distance with an image shift due to change in illumination wavelength, such as to keep iris images from respective object distances in focus.

It will be therefore appreciated that for any optical system which is to be employed within a mobile device, such as a smartphone or tablet, for acquiring images of a user's iris, it is desirable to extend the DOF such as to acquire in-focus images of the user's iris across as large a range of distances as possible to allow for maximum variation in the distance at which a user holds the mobile device from their face, but without needing to increase the depth of the device housing to accommodate the optical system.

SUMMARY

According to the present invention, there is provided an iris image acquisition system for a mobile device according to claim 1.

In the embodiments of the invention, the lens assembly of the system comprises a refractive element which varies in thickness so as to correct for an image shift induced by a change in iris-lens assembly distance, thus maintaining imaged irises in focus.

As such, the embodiments can provide a continuous focus for imaging user's irises over an extended DOF. Thus, when suitable NIR illumination is provided, the fine details of the user's irises can be sharply captured across a large range of distances at which the user can hold a mobile device including the system from their face.

In the embodiments, the extension of the DOF is achieved without need for mechanical refocusing, intensive computations or a dedicated particular NIR illumination such as disclosed in PCT Application WO2017/215952 (Ref:

FN-477-PCT), and without requiring a significant increase in depth of the system lens assembly.

For example, embodiments that include a lens assembly with an axicon element dedicated for extending the DOF and an air spaced doublet can extend the DOF by comparison to using conventional lenses with an annular field of view, while the total track length (TTL) of the lens assembly is about 4.9 mm.

Alternatively, embodiments that including a Zernike element dedicated for extending the DOF and two other aspheric lenses can extend the DOF up to 2.8 times than when using conventional lenses, while the TTL of the lens assembly is about 4.5 mm.

In both cases, the TTL allows the imaging system to be shallow enough to be accommodated in the limited space available in a housing of a mobile device, especially a smartphone or tablet.

DESCRIPTION OF DRAWINGS

Embodiments of the invention will now be described, by way of example, with reference to the accompanying drawings, in which:

FIG. 3 illustrates coefficient values for the surfaces of the elements included in the lens assembly of FIG. 2;

FIG. 4 illustrates system data and characteristics for the lens assembly illustrated in FIG. 2;

FIG. 5 illustrates optical characteristics of an iris image acquisition system including the lens assembly illustrated in FIG. 2;

FIG. 7 illustrates coefficient values for the surfaces of the elements included in the lens assembly of FIG. 6;

FIG. 8 illustrates system data and characteristics for the lens assembly illustrated in FIG. 6; and FIG. 9 illustrates optical characteristics of an iris image acquisition system including the lens assembly illustrated in FIG. 6.

DESCRIPTION OF THE EMBODIMENTS

Figure 1:
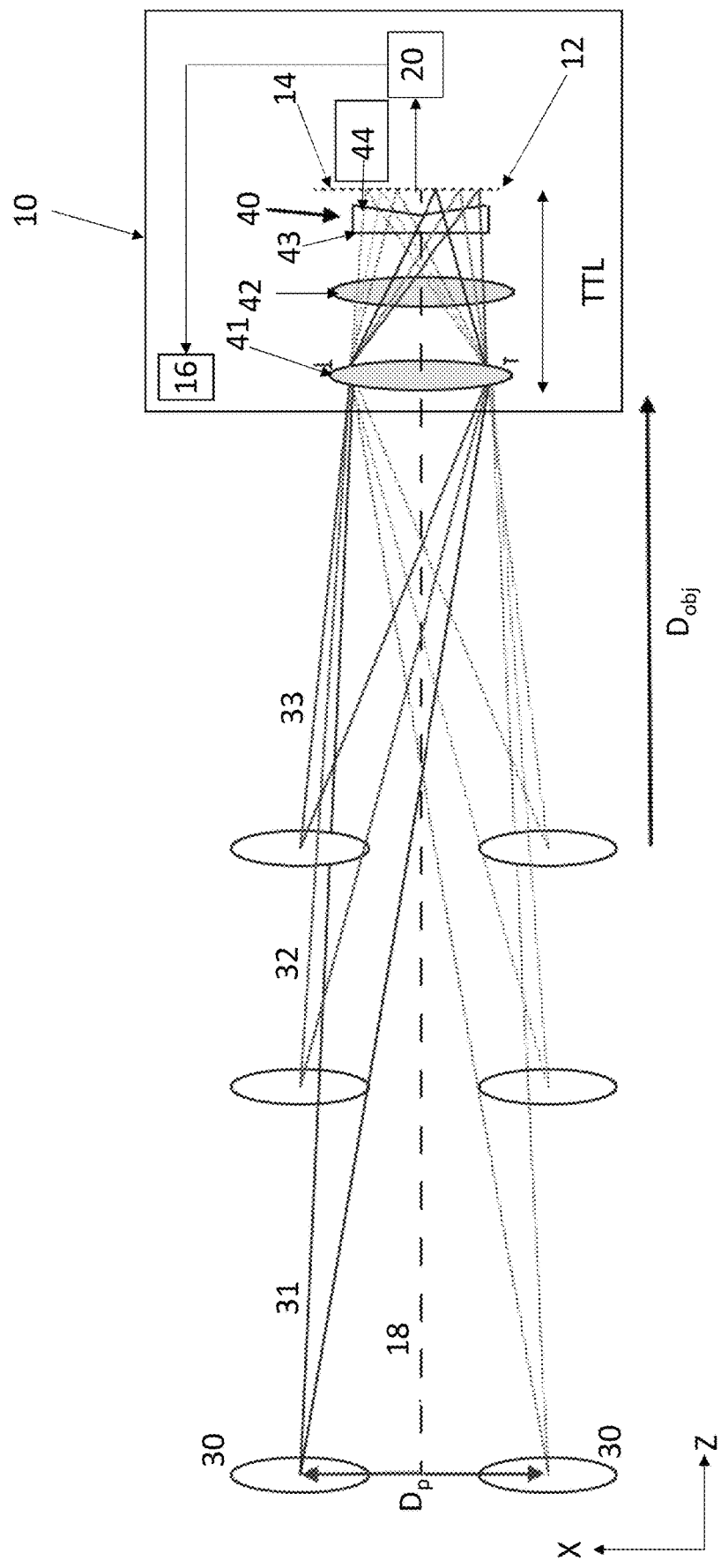
FIG. 1 illustrates imaging of two irises at three different object distances from a lens assembly of an iris image acquisition system according to an embodiment of the present invention.

Referring now to FIG. 1, there is shown schematically an iris image acquisition system 10 according to an embodiment of the present invention. The system 10 comprises a fixed focus lens assembly 12 disposed in front of a fixed position image sensor 14; the assembly 12 is arranged along an optical axis 18 for converging incident radiation towards and forming an image on the sensor 14. The sensor 14 is a planar image sensor, and in some embodiments of the invention it can be an RGBW type sensor, such as a Color Filter Array (CFA) where at least some of the W pixels or sub-pixels are sensitive to NIR radiation (either exclusively or as well as RGB). In other embodiments, an NIR transmission filter with a cut-off wavelength just beyond the required bandwidth can also be used with an image sensor. It will be appreciated that any other type of sensor can be used in the system 10. The system 10 further comprises an NIR illumination source 16 for providing a narrow spectral band (e.g. in the range of approximately 700-960 nm) to illuminate objects disposed frontally to the lens assembly 12.

In any case, the operation of each of the sensor 14 and the source 16 is controlled by a processor 20. The processor 20 can be a dedicated processor or processing module especially arranged to perform biometric recognition of a user of a mobile device including the system 10; or the processor 20 can be a general-purpose processor within a camera of the device and which is arranged to process images acquired from the sensor 14 for the purposes of biometric recognition as well as to run other camera applications.

FIG. 1 also illustrates a pair of irises 30 to be imaged by the system 10, such as the irises of a user of the mobile device including the system 10 (as will be appreciated from the disclosure below, FIG. 1 is schematic and not to scale). The irises 30 are shown at fixed height from an axis 18, and at three different object positions $D_{obj}$ along the axis 18. For iris imaging, it can be assumed that each of the irises 30 is located at height $D_p/2$ from the axis 18, where $D_p$ is the inter-pupillary distance which typically ranges from 60 to 80 mm, with an average range of 60-64 mm.

As can be further appreciated from FIG. 1, the field angles between the irises 30 and the axis 18 increase as the irises 30 come closer to the lens assembly 12. As the field angles increase, the height relative the axis 18 of the iris images formed by the lens assembly 12 increases. Thus, a change in $D_{obj}$ results in a transverse shift relative to the axis 18 of the iris images formed on the image sensor 14.

As expected, a change in $D_{obj}$ tends to induce a longitudinal shift along the axis 18 of the formed iris images, with the formed iris images coming closer to the lens assembly 12 as $D_{obj}$ increases. As such, a longitudinal shift can result in a misalignment between the imaged irises and sensor 14, ultimately limiting the available DOF of the system 10.

In order to counteract this longitudinal shift, the lens assembly 12 of the system 10 comprises a dedicated refractive plate 40 arranged closer to the sensor 14 than two other, otherwise conventional type lens elements 41, 42 for converging the incoming radiation towards the plate 40.

In particular, the plate 40 is a negative refracting element having a thickness along the axis 18 which varies according to a distance X from the axis 18. The variable thickness of the plate 40 is delimited by a substantially flat surface 43 and an opposed axicon conical surface 44 having an apex on the axis 18 extending away from the sensor 14.

With reference to FIG. 1, ray bundles 31, 32, 33 generated from the NIR illuminated irises 30 at different distances $D_{obj}$ are converged towards and pass through the variable thickness of the plate 40 at different heights relative to the axis 18, due to the change in the iris field angles. As such, ray bundles generated from the irises 30 at different distances $D_{obj}$ pass through different thickness lengths of the plate 40 and, therefore, are subject to a different alteration of their paths towards the sensor 14.

Advantageously, the variable thickness as defined by the delimiting axicon surface 44 is suitable for differently altering the optical paths of the ray bundles generated from the irises 30 at different distances $D_{obj}$, such as to counteract a longitudinal shift of such iris images induced by the change in $D_{obj}$. (In practice, plate 40 actively introduces an iris image aberration for compensating for the longitudinal iris image shift due to a change in $D_{obj}$.) As a result, the formed images of the irises 30 remain focused on the planar surface of the sensor 14, although at different areas of the sensor 14 due to the transverse image shift relative to the axis 18. In particular, with reference to FIG. 1, an inner area of the sensor 14 will be in focus with the formed images of the irises 30 shown farther from the lens assembly 12, an outer concentric area of the sensor 14 will be in focus with the formed images of the irises 30 shown closer to the lens assembly 12, and an intermediate concentric area of the sensor 14 will be in focus with the formed images of the irises 30 shown at an intermediate $D_{obj}$ from the lens assembly 12.

Thus, the variation in thickness of the plate 40, as defined by the axicon surface 44, ultimately results in an extended continuous DOF for the off-axis pair of irises 30 within a range of distances $D_{obj}$.

Figure 2:
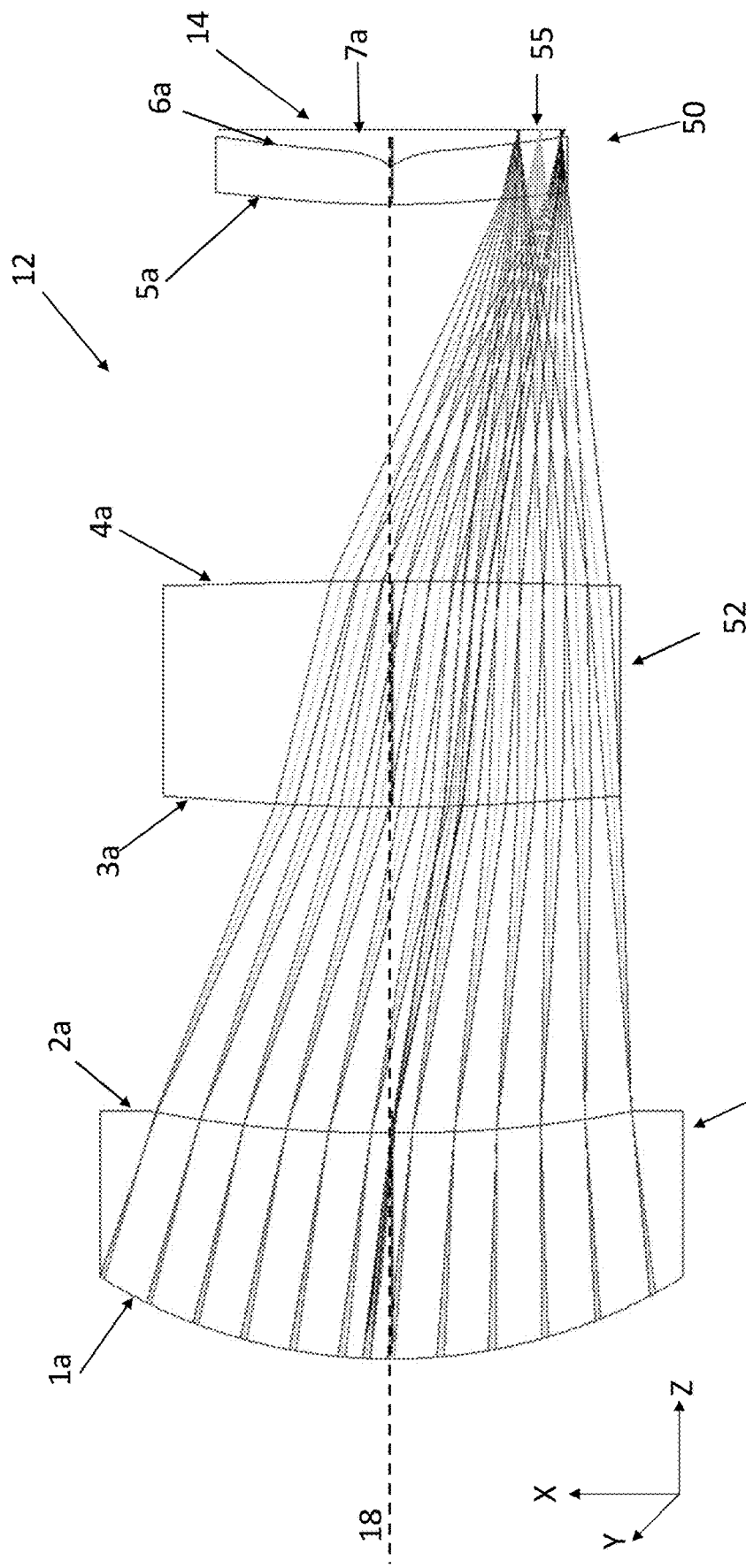
FIG. 2 illustrates a model of a first embodiment of lens assembly which can be used in an iris image acquisition system according to the present invention.

The use and configuration of an axicon-like refractive element dedicated for extending the DOF for the irises 30 is now disclosed in detail with reference to the lens assembly 12 shown in FIG. 2, which can be used in the system 10. For the purposes of this specification, an "axicon-like refractive element" has at least one "conical-like surface" resembling an axicon surface, but without discontinuities, so that it can be represented by an odd-aspheric polynomial.

In particular, the axicon-like refractive element used in the assembly 12 shown in FIG. 2 is a bi-axicon refractive plate 50, which can be made for example of N-SF5 glass. Again, the plate 50 has no optical power. The change in the plate thickness at different heights from the axis 18 required to correct the longitudinal shift of the imaged irises induced by a change in $D_{obj}$ is obtained by two opposed axicon surfaces 5a and 6a.

Surface 6a, which is the surface of the assembly 12 closest to the sensor 14, is substantially a negative, rotationally symmetric, conical-like surface having its apex positioned on the axis 18 and extending away from the sensor 14. The shape of surface 6a can be defined by the odd-aspheric polynomial:

$$z = a_1 y + b_1 y^2 + c_1 y^3 + d_1 y^4 + e_1 y^5 + f_1 y^6 \quad (1)$$

Surface 5a is also a conical-like surface, extending away from the image sensor 14 and having its apex positioned on the axis 18. The shape of surface 6a can be defined by the odd-aspheric polynomial:

$$z = a_2 y + b_2 y^2 + c_2 y^3 \quad (2)$$

The first linear term of polynomials (1) and (2) describes the inclination angle of the apex of the surfaces 5a and 6a with the axis 18, and the higher order terms determine a continuous surface shape such that the formed iris images remain in continuous focus on the planar surface of the sensor 14 over the extended DOF.

FIG. 3 shows exemplary odd aspheric values calculated for the coefficients $a_1, \ldots f_1$ and $a_2, \ldots c_2$ of polynomials (1) and (2). Nevertheless, it will be appreciated that the illustrated values and the degree for the polynomials (1) and (2) can be different than the ones herein disclosed only for exemplary purposes.

The lens assembly 12 illustrated in FIG. 2 further comprises an air-spaced doublet including two lenses 51, 52 for converging incident radiations towards the plate 50, which can be also be made for example of N-SF5 glass.

The lens 51 comprises a convex aspheric surface 1a, which is the first surface of the assembly 12 reachable by incident radiation, and an opposed concave surface 2a. The lens 52 is arranged along the axis 18 between the lens 51 and the plate 50, and comprises two opposite convex aspherical surfaces 3a and 4a.

It will be further appreciated from FIG. 2 that the lenses 51, 52 are configured to converge incident bundles of rays towards the variable thickness outer peripheral portion of the plate 50. This is because towards the centre of the field of view, the plate 50 performs poorly by comparison to the periphery. Indeed, as the field increases toward the region of interest containing the irises 30, the rms wavefront error falls below the diffraction limit. Since the irises 30 are off-axis objects, it is therefore acceptable to jeopardize the centre of the field of view using the plate 50 in order to increase the optical performances at the periphery of the field where the irises 30 are located.

In addition to converging the incident radiation to the peripheral variable thickness of the plate 50, the lenses 51 and 52 can be configured to correct for optical aberrations.

FIG. 3 also shows exemplary coefficients calculated for describing the even aspheric surfaces 1a, 2a and 3a, 4a of the lenses 51 and 52.

Optical system data and characteristics for the plate 50 and lenses 51 and 52 are given in FIG. 4.

As summarized by data given in FIG. 5, using the lens assembly 12 of FIG. 2 and a commercially available narrow-band NIR LED emitting at a wavelength of 940 nm ±20 nm as illumination source 16, the irises 30 can be imaged in focus with the lens assembly 12 at a across an effective extended DOF ranging from about 220 mm to 400 mm, having a full field of view in object space between about 30 and 40 mm (which is sufficient to image one eye at a time).

Furthermore, the lens assembly 12 has a focal length of about 2.56 mm with an entrance pupil diameter of about 2.2 mm (resulting in a f-number of about 1.16), and a TTL of about 4.9 mm.

It can be therefore appreciated how the system 10 can extend the DOF by comparison to using a conventional lens assembly, while remaining shallow enough to be accommodated in the limited space available in a housing of a smartphone or tablet.

Figure 6:
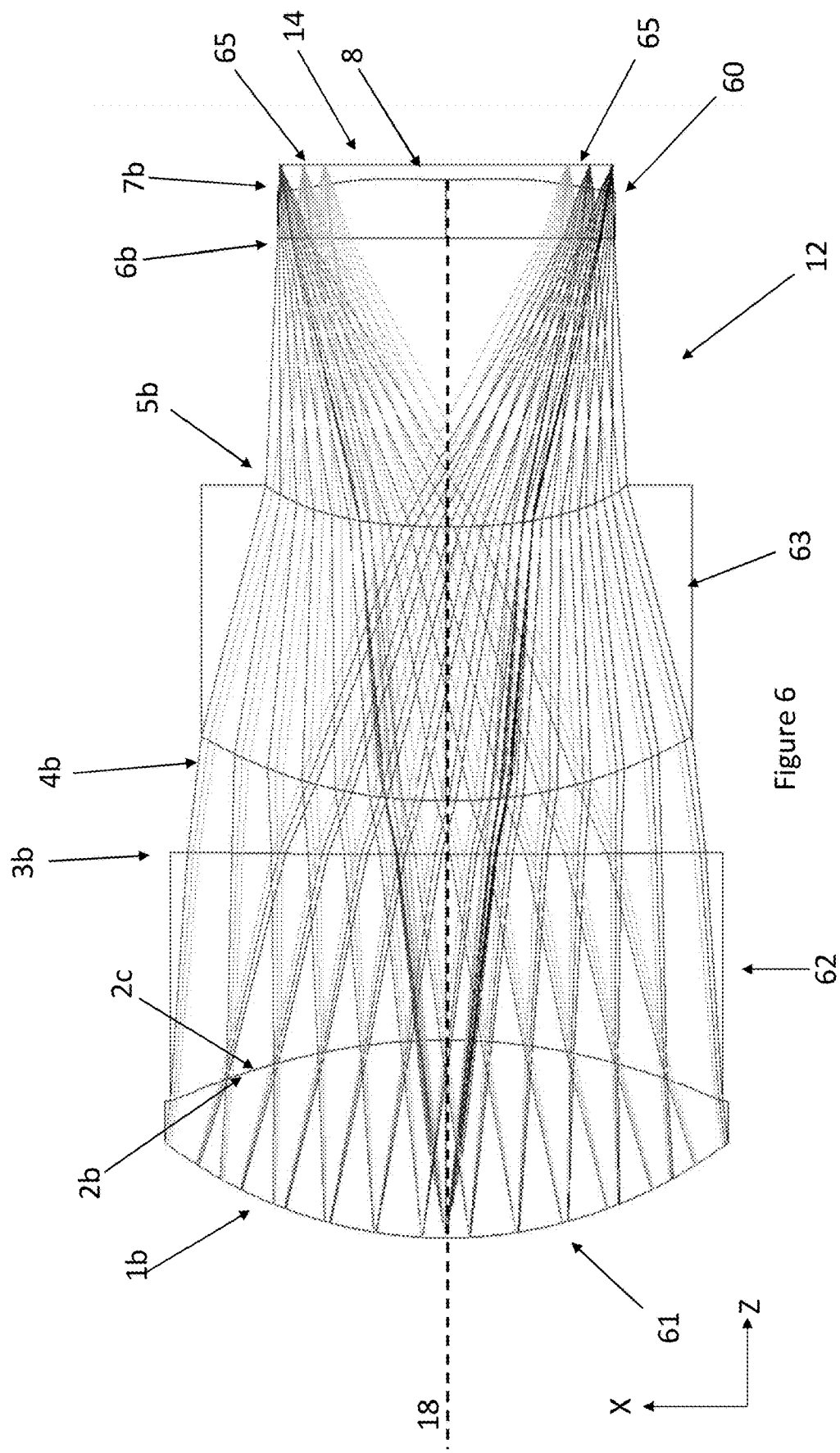
FIG. 6 illustrates a model of a second embodiment of lens assembly which can be used in an iris image acquisition system according to the present invention.

With reference now to FIG. 6, an alternative lens assembly 12 is shown for system 10. In this assembly 12, the refractive element dedicated to extend the DOF is a "Zernike" plate 60 (which can be made for example of N-BK7 or N-SF5 glass). As in the example of FIG. 2, the plate 60 is a negative refracting element having a thickness along the axis 18 which varies continuously, i.e. without sharp changes or interruptions. As will be explained below, again the plate 60 has no optical power.

The change in the plate thickness at different heights from the axis 18 required to correct the longitudinal shift of the imaged irises induced by a change in $D_{obj}$ is obtained by a Zernike surface 7b, which is the surface of the lens system 12 closest to the sensor 14, opposed to a substantially flat surface 6b.

Zernike fringe polynomials are widely used for describing a surface in freeform optics for example, as disclosed in Fuerschbach, K., Rolland, J. P., and Thompson, K. P., "A new family of optical systems employing—polynomial surfaces," Optics express 19(22), 21919{21928 (2011) and Broemel, A., Lippmann, U., and Gross, H., "Freeform surface descriptions. part i: Mathematical representations," Advanced Optical Technologies 6(5), 327{336 (2017).

In particular, Zernike polynomials are useful in freeform design as they are orthogonal and complete polynomials, as disclosed in Ye, J., Chen, L., Li, X., Yuan, Q., and Gao, Z., "Review of optical freeform surface representation technique and its application," Optical Engineering 56(11), 110901 (2017). The plate 60 can be represented with Zernike polynomials as a circular aperture is most common in photographic optics.

In particular, such a surface shape can be represented using Zernike fringe polynomials according to the following formula:

$$z = \frac{cr^2}{1+\sqrt{1-(1+k)c^2r^2}} + \sum_{i=1}^{8}\alpha_i r^{2i} + \sum_{i=1}^{N} A_i Z_i(\rho,\phi)$$

where c is the curvature of the surface, r is the radius where $r^2=x^2+y^2$, and k is the conic constant. The aspheric coefficients are denoted by $\alpha_i$, and $A_i$ is the coefficient on the $i^{th}$ Zernike fringe polynomial, as explained in Gross, H., Zugge, H., Peschka, M., and Blechinger, F., "Handbook of optical systems, volume 3: Aberration theory and correction of optical systems," (2007).

In the specific lens assembly 12 shown in FIG. 2, the plate 60 has no optical power and it is designed without using aspheric coefficients $\alpha_i$. As such, the shape of surface 7b is only defined by the sum of Zernike fringe terms $A_i Z_i(\rho,\phi)$ including coma, spherical aberration and trefoil, resulting in a sagittal surface shape.

FIG. 7 shows exemplary coefficients calculated for the Zernike fringe terms defining the surface 7b. Note that surface 7b departs from a rotational symmetry, such as the rotational symmetry of an axicon surface.

Nevertheless, it will be appreciated that the illustrated values and the numbers of Zernike fringe terms can be different than the ones herein disclosed only for exemplary purposes.

The assembly 12 shown in FIG. 6 further comprises an achromatic doublet for axial colour correction including mutually matched lenses 61 and 62, which can be manufactured for example using N-BK7 or N-SF5 glass.

Lens 61 comprises a convex odd aspheric surface 1b, which is the first surface of the assembly 12 reachable by incident radiation, and an opposed convex spherical surface 2b juxtaposed to a shape-matching concave spherical surface 2c of lens 62. Lens 62 further comprises a slightly odd aspheric surface 3b opposed to surface 2c.

A further lens 63 is arranged along the axis 18 between the doublet 61-62 and the plate 60, having a convex odd aspheric surface 4b faced towards surface 3b of the lens 62 and an opposed concave odd surface 5b faced towards the flat surface 6b of the plate 60.

From FIG. 6 it will be further appreciated that lenses 61, 62 and 63 are configured to converge incident bundles of rays towards a variable thickness outer portion 65 of the plate 60, similarly to the ray bundles convergence induced by the assembly 12 shown in FIG. 2.

FIG. 7 also shows exemplary coefficients calculated for describing the odd aspheric surfaces 1b, 3b, 4b and 5b of lenses 62 and 63.

Optical system data and characteristics for the plate 60 and lenses 61, 62 and 63 are given in FIG. 8.

As summarized by data given in FIG. 9, using the lens assembly 12 of FIG. 6 and a commercially available narrow-band NIR LED emitting at a wavelength of 940 nm ±20 nm as illumination source 16, the irises 30 can be imaged in focus with the lens assembly 12 at a distance ranging from about 200 mm to 400 mm, having a full field of view in object space between about 30 and 40 mm.

Furthermore, the lens assembly 12 has a focal length of about 3.39 mm with an entrance pupil diameter of about 2.2 mm (resulting in a f-number of about 1.5), and a TTL of about 4.5 mm.

It can be therefore appreciated how the system 10 can reach a DOF of approximately 70 mm at any point within an extended DOF range 200-400 mm, which results in an extended DOF of 2.8 times than when using a conventional lens assembly, while remaining shallow enough to be accommodated into a smartphone housing.

The limit to which the DOF can be extended is linked to the f-number. The furthest possible object-point from the lens assembly 12 in which the DOF region can extend is determined by the contrast attainable for imaging the irises 30. It is desirable that the lens assembly 12 acquire a minimum 40% contrast for 2 cycles/mm in object space to image the fine structures used in user authentication. The nearest object position to the lens assembly 12 that can be successfully imaged is limited by field aberrations. For a $D_{obj}$ of 200 mm, the cut-off frequency is 115 cycles/mm.

It will be appreciated that the specific lens arrangements illustrated in FIGS. 1, 2 and 6 as well as the optical characteristics illustrated in FIGS. 3-5 and 7-9 are for exemplary purposes only, and the invention is not to be regarded as being limited to any particular one of these.

In particular, the shape of the refractive element can be different from the shapes of the illustrated plates 40, 50 and 60, but still suitable for defining a variable thickness so as to counteract longitudinal shifting of the imaged irises due to changes in $D_{obj}$.

Furthermore, as a variation of the arrangement illustrated in FIG. 6, a plate can be employed having one Zernike surface facing the sensor 14 or two opposed Zernike surfaces.

Regarding the lens stage for converging radiation to the refractive element dedicated to extending the DOF, the number, reciprocal positioning and shape of the lens surfaces can be different than the illustrated ones. For example, different lens materials having a different refractive index and/or Abbe number may be used, yielding different surface shapes. For example, lenses can be added or substituted in order to effect a desired aberration correction of the ray bundles to be converged on the refractive element dedicated to extend the DOF.

As a further variation to the arrangements disclosed above, one or more optical elements, such as positive or negative lenses, can be interposed between the element dedicated to extend the DOF and the sensor 14.

Finally, while the optical system 10 has been described above in terms of a lens assembly 12 for a smartphone type camera and these are typically integrated with such devices, it will be appreciated that in other embodiments of the invention, the optical system could be provided as a discrete or integrated lens accessory for any general purpose mobile device or portable image acquisition device.

The invention claimed is:

1. An image acquisition system for a mobile device, comprising:
    a lens assembly arranged along an optical axis and configured for forming an image comprising an iris of a subject disposed frontally to the lens assembly; and
    an image sensor configured to acquire the formed image;
    wherein:
    the lens assembly comprises an afocal refractive element and a lens element for converging incident radiation to the refractive element;
    the refractive element having a thickness that varies based at least in part on a distance of the refractive element from the optical axis;

the refractive element configured to counteract a shift of the formed image along the optical axis induced by change in distance between the iris and the lens assembly, the refractive element further configured to cause the iris to be in focus at a first distance from the refractive element and at a second distance from the refractive element, the second distance different from the first distance.

2. The image acquisition system of claim 1, wherein the lens assembly is further configured to cause the formed image at the first distance to be in focus at a first area of the image sensor and to cause the formed image at the second distance to be in focus at a second area of the image sensor.

3. The image acquisition system of claim 1, wherein the refractive element comprises:
   a first thickness at a first distance from the optical axis;
   a second thickness at a second distance from the optical axis; and
   a surface shape that varies continuously from the first distance from the optical axis to the second distance from the optical axis.

4. The image acquisition system of claim 1, wherein said refractive element comprises an axicon optical element.

5. A mobile device comprising the image acquisition system according to claim 1 and further comprising a processor arranged to analyze images acquired from said image sensor to perform biometric recognition.

6. The image acquisition system of claim 1, wherein said refractive element comprises an element with a surface defined by Zernike fringe polynomials.

7. The image acquisition system of claim 6, wherein said refractive element comprises a surface facing said image sensor defined by Zernike fringe polynomials.

8. The image acquisition system of claim 1, wherein said refractive element comprises a first surface and a second surface, the first surface facing the lens element and the second surface facing the image sensor.

9. The image acquisition system of claim 8, wherein the lens element is configured to converge incident radiation on the second surface of the refractive element.

10. The image acquisition system of claim 8, wherein the second surface is spaced a first distance from the image sensor and a second distance from the image sensor, the second distance being different than the first distance.

11. The image acquisition system of claim 1, wherein said lens element comprises an aspheric lens element.

12. The image acquisition system of claim 11, wherein the aspheric lens element is configured to correct optical aberration.

13. The image acquisition system of claim 11, wherein the aspheric lens element comprises an optical element configured to correct an axial colour in the formed image.

14. The image acquisition system of claim 1, wherein said first distance or the second distance comprises 400 mm or less.

15. The image acquisition system of claim 14, wherein said first distance or said second distance is in a range of 200 and 400 mm.

16. The image acquisition system of claim 15, wherein the second distance is along the optical axis and is greater than the first distance.

17. The image acquisition system of claim 1, wherein the refractive element comprises an axicon surface.

18. The image acquisition system of claim 17, wherein the thickness of said refractive element decreases towards the centre of the axicon surface.

19. The image acquisition system of claim 17, wherein said lens assembly has a total track length of 4.9 mm.

20. The image acquisition system of claim 17, wherein said axicon surface comprises at least a first surface facing the image sensor and defined by a first polynomial including first odd aspheric coefficients.

21. The image acquisition system of claim 20, wherein said axicon surface has a second surface opposed to said first surface and defined by a second polynomial comprising second odd-aspheric coefficients.

22. The image acquisition system of claim 21, wherein said first surface comprises a conical surface where a distance of said surface from said image sensor is greatest along said optical axis and said second surfaces comprises a conical surface where a distance of said surface from said image sensor is greatest along said optical axis.

* * * * *